United States Patent Office 2,889,226
Patented June 2, 1959

2,889,226

SELF-DISSOLVING INSTANT COFFEE TABLETS

David F. Hinkley, Plainfield, N.J., assignor of one-half to Morris Solotorovksy, North Plainfield, N.J.

No Drawing. Application October 2, 1957
Serial No. 687,615

10 Claims. (Cl. 99—66)

This invention relates to instant coffee in tableted form and particularly to instant coffee tablets which are rapidly self-dissolving in hot water. More particularly the invention relates to tablets of instant coffee, alone or in conjunction with sweetening agent and/or milk solids, which rapidly and cleanly dissolve in hot water to form without stirring or agitation coffee drinks of uniform and reproducible quality. This application is a continuation-in-part of my prior application Serial No. 536,023, filed September 22, 1955.

In recent years there has been a rapidly growing trend toward the use of so-called instant coffee in the place of ground coffee beans from which the coffee must be extracted in a percolator, dripolater, and the like. Instant coffee has advantages of time saving and convenience over ground whole coffee beans, but there are at the same time various inherent disadvantages characteristic of instant coffee as currently available on the market. It is customary, for example, to distribute instant coffee as a loose powder in containers of various size from which an appropriate quantity of the powder must be removed by means of a measuring implement, such as a teaspoon, or the like, and carelessness or inaccuracy in measuring out the amount of powder results both in wide fluctuation in the quality or strength of coffee, and frequent loss and mess through spillage when prepared in this manner.

It will also be recognized that instant coffee in many households is used not as a replacement for regular brewed coffee, but as a supplement to be used infrequently, as for example when a single cup of coffee is desired, or when time does not permit brewing in one of the conventional ways. In other words, in many homes a container of instant coffee powder may not be wholly consumed for several weeks or even months and during such time interval after initial opening of the container there will be marked deterioration and loss of flavor in the remaining coffee powder due to the volatility and oxidizability of the flavor oils exposed in the finely divided powder.

An object of the present invention is to overcome the disadvantages above mentioned by providing instant coffee in form of stable convenient tablets of uniform size which when added to a cup, or other predetermined quantity, of hot water will consistently produce coffee of uniform strength or quality. By providing instant coffee in soluble tablet form the amount of deterioration or loss of strength is greatly reduced; and if desired, instant coffee tablets can be individually packaged in sealed wrappers or casings so that full strength of the coffee is retained until the individual casing or tablet wrapping is opened for use.

In preparing coffee from the usual instant coffee powder by mixing a quantity of powder with hot water, an amount of stirring is generally required before the coffee powder is entirely dissolved. It might be expected, therefore, that a coffee tablet of a size for example, sufficient to make a cup of coffee, would be difficultly soluble and impractical to use due to prolonged stirring required to dissolve the same. I have discovered, however, that it is possible to prepare soluble instant coffee tablets of a size suitable to make one cup of coffee per tablet which will completely dissolve in hot water in 60 to 90 seconds or less without stirring, but which are even more rapidly dissolved with mild stirring. Such rapid dissolving of the coffee tablets is made possible by preparing tablets from an intimate or homogeneous mixture of powdered instant coffee, small amounts of a wetting agent, which also acts as a binder and die lubricant, and a disintegrating combination activated by hot water, comprising sodium bicarbonate and a tasteless, edible organic acid such as alginic acid.

Regarded in certain of its broader aspects, the improved coffee product in accordance with my invention can be described as a self-dissolving instant coffee tablet comprising as a formed body a homogeneous mixture of 60 to 90 parts by weight of instant coffee powder, 4 to 10 parts of a wetting agent having properties of a binder, and 6 to 30 parts of a water activated disintegrating agent which is one-third sodium bicarbonate and two-thirds alginic acid, or other tasteless edible organic acid. This basic formulation, which provides black coffee when dissolved in water, can be supplemented with a sweetening agent and/or milk solids in the manner hereinafter described.

Instant coffee tablets in accordance with my invention can be prepared using as starting material any of the instant coffee powders currently on the market. Such coffee powders are prepared in various ways from ground roasted coffee by brewing the coffee, separating the grounds from the resulting brew and drying the resulting brew to recover the dissolved solids therein. Various precautions are taken in the concentrating steps in order to minimize loss of volatile taste imparting components. Typical procedures for preparing instant coffee powder have been described in "Food and Food Products," by Morris D. Jacobs, second edition, vol. 2, pages 1680–1681, published by Academic Press, New York, New York, 1951. It is to be noted, however, that the details of preparing instant coffee powder form no part of the present invention.

As wetting agents having properties of a binder for preparing instant coffee tablets, I preferably employ polyethylene glycols having a molecular weight within the range of 3000 to 7500 which may be obtained commercially, as for example Carbowax 4000 (having an average molecular weight of 3000 to 3700) and Carbowax 6000 (having an average molecular weight of 6000 to 7500). These polyethylene glycols have an unusual capacity to wet, emulsify, or otherwise aid in the dissolving of, the water resistant coffee oils, and it is considered that this wetting action is a primary factor in achieving the rapid, clean solution in hot water characteristic of my coffee tablets. In addition, the polyethylene glycols, being virtually tasteless, do not impair the taste or quality of coffee prepared from the tablets. At the same time, the polyethylene glycols act as die lubricants and effective binders, with the result that my tablets are readily prepared in a durable form capable of withstanding rough handling without breakage or erosion.

As a disintegrating agent, I employ sodium bicarbonate, in combination with a tasteless, edible organic acid to provide a mixture which, upon addition to water, releases carbon dioxide to break apart the tablet as it is dissipated. Alginic acid, which is odorless and tasteless, and which is recognized as a safe edible organic acid, is by far the acid of choice. The tasteless property of the acid is of primary importance. Common edible acids such as citric and tartaric acid are entirely unsatisfactory due to their gross contamination of the delicate coffee flavor. In instances where saccharine is used as a sweetening agent as hereinafter described, it can perform part of the acid function, and permit a reduction in the amount of other acid employed.

In the basic formulation for making black coffee or for combining with milk and/or sweetening agents to make tablets for other coffee drinks, the proportions preferably employed are 60 to 90 parts by weight of instant coffee powder, 4 to 10 parts by weight of polyethylene glycol having a molecular weight within the range of 3000 to 7500, and 6 to 30 parts of disintegrating agent comprising 2 to 10 parts of sodium bicarbonate and 4 to 20 parts of alginic acid with the bicarbonate and acid being in about a 1 to 2 ratio.

When tablets for sweetened coffee are desired, the sweetening agent can be ordinary sugar or sucrose, but in view of the bulk which would be thereby added, it is preferable to employ a concentrated sweetening agent, such as saccharine (anhydro-o-sulfaminebenzoic acid) or Sucaryl, sodium (the sodium salt of cyclohexanesulfamic acid). About one part of saccharine per a hundred parts of the basic black coffee mixture above mentioned will provide normal desired sweetness. Sucaryl is an even more potent sweetening agent, and as little as about two-tenths to five-tenths of a part by weight will suffice to sweeten a hundred parts by weight of the basic mixture.

When it is desired to provide a tablet which will produce either coffee with "cream" or sweetened coffee with "cream," powdered milk or milk and cream solids can be blended with the basic mixture before tableting. One problem with a preparation of such products is the substantial increase in bulk provided by the powdered milk since about 1.6 to 3 parts by weight of the powdered milk must be employed for each part by weight of the basic coffee mixture. Thus, a substantially larger tablet is required in making a cup of coffee with milk or "cream." Alternatively, the product can be prepared in smaller tablets with instructions to use two or more tablets for a cup of water.

When tablets are to be stored for extended periods, it is preferable to incorporate in the mixture before tableting, a small amount of an edible preservative, such as butylated hydroxy anisole, or butylated hydroxy toluene at the rate of about 0.1 mg. per cup size tablet. Other preservatives can of course be employed, and in instances where tablets are to be consumed within a limited time, or where tablets are individually wrapped in airtight unit packages, the preservative can be eliminated. Accordingly, the preservative is not considered to be an essential component in my new coffee products, but one which can be used, eliminated, or varied to comply with the type of use and packaging contemplated.

I have found that in the preparation of a cup of coffee of normally desired strength approximately 1.4 gm. of powdered instant coffee is required. Accordingly, tablets intended for the brewing of a cup of coffee should contain approximately this amount of instant coffee powder.

The preparation of tablets is accomplished by simple blending together of the several components to form a homogeneous mixture and then compressing appropriate amounts of the mixture into tablets in a conventional tableting machine. Tablets are suitably formed in a flat or wafer-like contour to facilitate disintegration. Thus, for example, tablets intended to produce one cup of black coffee per tablet may be in the form of round wafers about three-quarters of an inch in diameter and one-fifth of an inch thick. It will be apparent, however, that the size and shape of tablets can be varied in many ways and for various purposes as for example, to physically characterize or identify a particular coffee product. The tablets may also be made with suitable indentations and/or apertures to provide a greater surface area, and thereby facilitate more rapid dissolving in hot water.

It will also be understood that it is within the scope of my invention to prepare smaller tablets of uniform size with the intention that some predetermined number be employed in producing cups of coffee of different size. Thus, for example, instructions can provide that "$x$" number of tablets be used with a normal "coffee" cup, "$y$" number of tablets can be used with a normal "tea" cup, and "$z$" number of tablets can be used with a normal "demi-tasse" cup. Whether using the individual cup size tablets, or the smaller tablets above mentioned, it will be evident that the use of tablets in the appropriate number eliminates the serious problem of inaccurate measuring which is encountered with the usual instant coffee powder.

The following examples demonstrate typical formulations in accordance with my invention, but it is to be understood that these examples are given by way of illustration and not of limitation.

Example I

A dry mixture for tablets of instant black coffee was prepared by mixing together

|  | Parts by weight |
|---|---|
| Instant coffee powder | 80 |
| Polyethylene glycol (Carbowax 6000) | 5 |
| Sodium bicarbonate | 5 |
| Alginic acid | 10 |

From this mixture tablets were prepared measuring approximately ¾" in diameter and ⅕" thick and each containing approximately 1.4 gm. of instant coffee powder. These tablets when immersed in a cup of hot water dissolve completely without stirring in 45 to 90 seconds.

About 500 each of the instant coffee tablets as described in Example I have been used in practical field tests which demonstrate that the tablets uniformly yield a cup of coffee that is in every way, color, odor, and flavor comparable to a cup of coffee obtained by dissolving the proper amount of instant coffee powder in hot water under the same conditions, as using the same hot water at the same time.

Example II

A dry mixture for tablets of instant black coffee was prepared by dissolving the following mixture in water:

|  | Parts by weight |
|---|---|
| Instant coffee powder | 80 |
| Polyethylene glycol (Carbowax 6000) | 5 |
| Alginic acid | 10 |

The solution was spray dried and the resulting powdered solids mixed with 5 parts by weight of sodium bicarbonate.

From this mixture tablets were prepared measuring approximately ¾" in diameter and slightly under ⅕" thick, and each containing about 1.4 gm. of instant coffee powder. These tablets when immersed in a cup of hot water dissolve completely without stirring in 30 to 60 seconds.

The intimate mixing of polyethylene glycol with the instant coffee powder obtained by the process of the foregoing example provides increased wetting action and more rapid dissolving of the tablets. Such intimate mixing can also be obtained by thorough dry mixing of the coffee powder and polyethylene glycol before adding the other components.

Example III

This example is given to show the comparative composition of tablets of the basic "black" coffee formulation and the same coffee supplemented with milk and/or sweetening agent. The quantities, expressed in grams, represent the quantities required for a single cup of coffee. The components are mixed together and the mixture is compressed into tablets of a suitable size so that one, two, or more tablets, as desired, will be dissolved in hot water to produce a cup of coffee.

[Weight of components (gm.) per "coffee" cup of coffee.]

|  | Black | Sweetened | With Milk | Sweetened with Milk |
|---|---|---|---|---|
| Instant Coffee powder | 1,400 | 1,400 | 1,400 | 1,400 |
| Polyethylene glycol (Carbowax 6000) | 0.087 | 0.087 | 0.087 | 0.087 |
| Sodium bicarbonate | 0.087 | 0.087 | 0.087 | 0.087 |
| Alginic Acid | 0.175 | 0.159 | 0.175 | 0.159 |
| Butylated hydroxyanisole | 0.001 | 0.001 | 0.001 | 0.001 |
| Saccharine |  | 0.016 |  | 0.016 |
| Powdered milk "Pream" |  |  | 3.250 | 3.250 |
| Total | 1.75 | 1.75 | 5.0 | 5.0 |

In the foregoing tabulation it will be noted that the presence of saccharine permits a slight reduction in the amount of alginic acid. It will also be noted that a one-cup tablet of the composition with milk would be approximately three times as large as one cup tablets for black or sweetened coffee. It is preferable in view of this added bulk to tablet the compositions with milk of a size so that two or more tablets are used for one cup of coffee.

*Example IV*

Coffee tablets were prepared containing different amounts (expressed in percent by weight) of instant coffee powder, polyethylene glycol (Carbowax 6000) alginic acid and sodium bicarbonate as indicated in the following table using a uniform procedure of thoroughly mixing the first three components and then admixing the sodium bicarbonate. The tablets contained amounts of the various mixtures to provide 1.4 gm./tablet of instant coffee, and were made with the same tableting machine and using, as nearly as possible, the same tableting pressure.

All of the tablets were well formed and durable in the dry state. Each type of tablet was tested for rate of solution in one cup of hot (80–98° C.) water under the following conditions:

A. Tablet floating—no stirring
B. Tablet floating—mild stirring
C. Tablet submerged—no stirring The solution times in minutes are tabulated below, together with information concerning flavor of the resulting coffee brews:

|  | A | B | C | D | E | F | G | H |
|---|---|---|---|---|---|---|---|---|
| Component: |  |  |  |  |  |  |  |  |
| Instant Coffee | 60 | 65 | 70 | 75 | 80 | 80 | 85 | 90 |
| Carbowax 6000 | 10 | 5 | 7.5 | 10 | 5 | 8 | 9 | 4 |
| Alginic Acid | 20 | 20 | 15 | 10 | 10 | 8 | 4 | 4 |
| Sodium Bicarb. | 10 | 10 | 7.5 | 5 | 5 | 4 | 2 | 2 |
| Solu. time A | 2 | 2 | 2 | 2 | 2 | 2 | 4 | 6 |
| Solu. time B | 1 | <1 | 1 | 1 | 1 | 1 | 2 | 3 |
| Solu. time C | <1 | <1 | <1 | <1 | <1 | <1 | <1 | <1 |
| Flavor | Wk. | Exc. | Gd. | Exc. | Exc. | Exc. | Exc. | Exc. |

In measuring the solution times in the foregoing table, the times were not measured in seconds for the reason that the tableting equipment used did not provide sufficient compression uniformity to make the more precise time measurement meaningful. Also for measurement of time in seconds to be meaningful it would be essential to have the water temperature held within much closer limits.

From this and other similar data which has been compiled, it is considered that the optimum range of coffee concentration is about 75 to 85%. With 90% coffee powder in the tablets, the solution time (except when submerged) becomes appreciably greater. On the other hand, if the amount of coffee is reduced to the 60 to 70% range, the flavor of the resulting brew is somewhat weak.

It is to be understood that a primary object of my invention is to provide tablets of such composition that a single tablet (or a small whole number of tablets), when placed in a predetermined amount of hot water, will dissolve rapidly to form a coffee drink of standard desired strength. Thus, the optimum amount of instant coffee may vary with different brands of instant coffee powder. Similarly the optimum amount of milk solids or milk and cream solids for producing a "normal lightening" in the resulting coffee drink may vary somewhat depending upon the brand of milk solids employed.

Various changes and modifications in the instant coffee tablets as herein disclosed will occur to those skilled in the art, and to the extent that such changes and modifications are embraced by the appended claims, it is to be understood that they constitute part of my invention.

I claim:

1. A self-dissolving instant coffee tablet comprising as a formed body a homogeneous mixture of about 60 to 90 parts by weight of instant coffee powder, 4 to 10 parts by weight of polyethylene glycol having a molecular weight within the range of 3000 to 7500, and 6 to 30 parts of a disintegrating combination comprising 2 to 10 parts of sodium bicarbonate and 4 to 20 parts of alginic acid, with the bicarbonate and acid being in about a 1 to 2 ratio.

2. A self-dissolving instant coffee tablet as defined in claim 1 wherein the quantity of instant coffee powder is within the range of 75 to 85 parts by weight.

3. A self-dissolving instant coffee tablet as defined in claim 1 wherein the tablet contains an amount of instant coffee powder required for preparing one cup of coffee.

4. A self-dissolving instant coffee tablet as defined in claim 1 wherein there is incorporated in said homogeneous mixture a small amount of a concentrated sweetening agent.

5. A self-dissolving instant coffee tablet as defined in claim 4 wherein the sweetening agent is anhydro-o-sulfaminebenzoic acid in the amount of approximately 1% of said homogeneous mixture.

6. A self-dissolving instant coffee tablet as defined in claim 4 wherein the sweetening agent is the sodium salt of cyclohexanesulfamic acid in the amount of approximately 0.2 to 0.5% of said homogeneous mixture.

7. A self-dissolving instant coffee tablet as defined in claim 1 wherein there is incorporated in each part by weight of said homogeneous mixture about 1.6 to 3 parts by weight of dry milk powder.

8. A self-dissolving instant coffee tablet as defined in claim 7 wherein there is also incorporated in said homogeneous mixture a small amount of a concentrated sweetening agent.

9. A self-dissolving instant coffee tablet as defined in claim 8 wherein the sweetening agent is anhydro-o-sulfaminebenzoic acid in the amount of approximately 1% of said homogeneous mixture.

10. A self-dissolving instant coffee tablet as defined in claim 8 wherein the sweetening agent is the sodium salt of cyclohexanesulfamic acid in the amount of approximately 0.2 to 0.5% of said homogeneous mixture.

References Cited in the file of this patent

UNITED STATES PATENTS

| 214,011 | Sultzer | Apr. 8, 1879 |
| 1,002,137 | Carreras | Aug. 29, 1911 |
| 1,229,052 | Ewing | June 5, 1917 |
| 1,367,715 | Pratt et al. | Feb. 8, 1921 |

FOREIGN PATENTS

| 6,401 | Great Britain | Apr. 13, 1888 |
| 17,063/34 | Australia | Aug. 21, 1934 |